(12) United States Patent
Krull et al.

(10) Patent No.: US 10,188,978 B2
(45) Date of Patent: Jan. 29, 2019

(54) ADHESIVE FLUTE SUPPORT WHILE WINDING FLUTED PACK

(71) Applicants: Timothy L. Krull, Kearney, NE (US); Jeffrey E. D. Rogers, Kearney, NE (US)

(72) Inventors: Timothy L. Krull, Kearney, NE (US); Jeffrey E. D. Rogers, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 0 days.

(21) Appl. No.: 15/776,701

(22) PCT Filed: Nov. 14, 2016

(86) PCT No.: PCT/US2016/061350
§ 371 (c)(1),
(2) Date: May 16, 2018

(87) PCT Pub. No.: WO2017/087325
PCT Pub. Date: May 26, 2017

(65) Prior Publication Data
US 2018/0345201 A1 Dec. 6, 2018

Related U.S. Application Data

(60) Provisional application No. 62/258,018, filed on Nov. 20, 2015.

(51) Int. Cl.
*B01D 46/00* (2006.01)
*B01D 46/52* (2006.01)

(52) U.S. Cl.
CPC ....... *B01D 46/527* (2013.01); *B01D 46/0001* (2013.01); *B01D 2265/06* (2013.01)

(58) Field of Classification Search
CPC .............. B01D 46/0001; B01D 46/527; B01D 2265/06
See application file for complete search history.

(56) References Cited

U.S. PATENT DOCUMENTS

| | | |
|---|---|---|
| 2004/0118771 A1 | 6/2004 | Schukar et al. |
| 2005/0252182 A1* | 11/2005 | Golden ............... B01D 46/527 55/521 |
| 2007/0186528 A1 | 8/2007 | Wydeven et al. |
| 2007/0193236 A1 | 8/2007 | Merritt |
| 2008/0135470 A1* | 6/2008 | Merritt ................. B01D 46/527 210/493.4 |

(Continued)

FOREIGN PATENT DOCUMENTS

WO    WO 2004/060521 A2    7/2004

*Primary Examiner* — Jason M Greene
(74) *Attorney, Agent, or Firm* — Reinhart Boerner Van Deuren P.C.

(57) ABSTRACT

Filter media packs and methods of forming the filter media packs are provided. The filter media packs include support beads for supporting flutes during winding of the filter media of the filter media pack. Filter media packs may also include stitch beads between adjacent layers of the filter media pack that are applied during the winding process to prevent slippage of adjacent layers of filter media. Methods of forming the filter media pack include applying the support beads or applying the stitch beads.

25 Claims, 7 Drawing Sheets

(56) References Cited

U.S. PATENT DOCUMENTS

2009/0114590 A1\* 5/2009 Merritt .............. B01D 46/0001
  210/493.4
2010/0242425 A1\* 9/2010 Swanson ............. B01D 46/527
  55/498

\* cited by examiner

ADHESIVE FLUTE SUPPORT WHILE WINDING FLUTED PACK

FIELD OF THE INVENTION

This invention generally relates to filter media packs and methods of making filter media packs.

BACKGROUND OF THE INVENTION

Filtration systems are used to remove impurities from a stream of fluid such as from air for use in downstream systems. For example, air may be filtered prior to entering an internal combustion engine. In such a system, the filtration system will often include a replaceable filter element that performs the filtration, which can be replaced with a new filter once the filter element is filled with impurities or otherwise becomes spent.

One particular type of filter element uses fluted filter media that is wound to form a filter media pack. In some instances, the fluted filter media is wound around a winding core to form a plurality of layers. Further, the filter media pack may often take non-round shapes such as race-track shaped. These non-round shapes are typically formed by winding the fluted filter media around a thin rectangular core.

However, as the non-round filter media pack is rotated to wind the fluted filter media about the winding core, the force applied from the winding core to the fluted filter media from the thinner sides of the winding core, as opposed to the wider faces of the winding core, is applied to a smaller area of the fluted filter media which can undesirably crush individual ones of the flutes proximate the thinner sides of the winding core.

Another problem related to wound filter media packs is that as the filter media pack is wound, the adjacent layers of wound fluted filter media can slip relative to one another due to the tension during the winding process. This slippage can further damage the flutes of the filter media, such as by way of reducing the open cross-sectional area of the flutes thereby reducing the desired flow characteristics of the resulting filter media pack. The slippage can also degrade the quality of the seal bead that is applied between the adjacent layers of fluted filter media The present invention relates to improvements over the current state of the art as it relates to wound filter media packs.

BRIEF SUMMARY OF THE INVENTION

Embodiments of the invention provide new and improved filter media packs as well as methods of forming the media packs. The filter media packs may be used to form filter elements.

In one embodiment, a method of forming a filter media pack is provided. The method includes winding a continuous strip of fluted filter media about a winding core about a winding axis. The strip of filter media extends between opposed first and second edges that are generally perpendicular to the winding axis. The fluted filter media includes a plurality of flutes formed by a first sheet operably secured to a corrugated sheet defining a plurality of peaks and valleys. The strip of fluted filter media is wound with the corrugated sheet being adjacent the winding core and radially inward of the first sheet. The strip of fluted filter media defines a feed axis generally parallel to the first and second edges and perpendicular to the winding axis. The winding core has opposed first and second sides extending generally parallel to the winding axis. The winding core defines opposed first and second faces defining a minor axis therebetween. The first and second sides extend generally between the first and second faces and define a major axis therebetween.

The method includes applying a first support bead between the winding core and the strip of filter media. The first support bead extends generally perpendicular to the first and second edges of the strip of filter media and parallel to the winding axis. The first support bead is located proximate the first side of the winding core. The first support bead fills the cross-section of at least two valleys on opposite sides of a peak of the corrugated sheet proximate the first side of the winding core. The first support bead distributes radially directed loading applied to the corrugated sheet from the first side of the winding core due to tension in the strip of filter media during winding.

In one embodiment, the method includes applying a seal bead generally parallel to the first and second edges of the strip of filter media and between the corrugated sheet and the winding core to prevent fluid bypass between the corrugated sheet and the winding core.

In one embodiment, the first support bead extends at least 33% of a length of an interface length between the winding core and the corrugated sheet that is generally parallel to the winding axis. In one embodiment, the first support bead extends an entire length of an interface length between the winding core and the corrugated sheet.

In one embodiment, the first support bead is allowed to partially cure or solidify before more than a first layer of the filter media is wound around the winding core.

In one embodiment, the first support bead is formed from hot melt material.

In one embodiment, the seal bead is formed from a foamed urethane and the first support bead is formed from hot melt.

In one embodiment, the first support bead provides an interface between the corrugated sheet and the first side of the support core and the first support bead cooperates with at least 50% of the first side when viewed in cross-section taken perpendicular to the winding axis.

In one embodiment, the first support bead provides an interface between the corrugated sheet and the first side of the support core and the first support bead extends 75% of the periphery of the first side from the first face to the second face when viewed in cross-section taken perpendicular to the winding axis.

In one embodiment, the method includes applying a second support bead parallel to the winding axis proximate the second side of the support core.

In one embodiment, the steps of applying the first and second support beads occur prior to winding.

In one embodiment, the step of applying the first support bead occurs by dispensing two separate strips of a material forming the first support bead to the strip of fluted filter media prior to winding such that three strips of material forming the first and second support beads are dispensed on the strip of fluted filter media prior to winding, after winding, the two separate strips of material form a single continuous strip of material that forms the first support bead.

In one embodiment, the step of applying the first support bead occurs by dispensing two separate strips of a material forming the first support bead to the strip of fluted filter media prior to winding, after winding, the two separate strips of material form a single continuous strip of material that forms the first support bead.

In one embodiment, one of the two separate strips secures a lead end of the strip of fluted filter media to the winding core and the first support bead.

In another embodiment, a filter media pack is provided. The filter media pack includes a winding core, a continuous strip of fluted filter media and a first support bead. The winding core has opposed first and second sides extending generally parallel to a winding axis. The winding core defines opposed first and second faces defining a minor axis therebetween in a direction perpendicular to the winding axis. The first and second sides extend generally between the first and second faces and define a major axis therebetween in a direction perpendicular to the winding axis. The continuous strip of fluted filter media is wound about the winding core about the winding axis to form a plurality of layers of fluted filter media. The strip of filter media extends between opposed first and second edges and includes a plurality of flutes formed by a first sheet operably secured to a corrugated sheet defining a plurality of peaks and valleys. The strip of fluted filter media has the corrugated sheet adjacent the winding core and radially inward of the first sheet after being wound. The first support bead is between the winding core and the strip of filter media. The first support bead extends generally perpendicular to the first and second edges of the strip of filter media and parallel to the winding axis. The first support bead is located proximate the first side of the winding core. The first support bead fills the cross-section of at least two valleys on opposite sides of a peak of the corrugated sheet proximate the first side of the winding core.

In one embodiment, the filter media pack includes a seal bead generally parallel to the first and second edges of the strip of filter media and between the corrugated sheet and the winding core to prevent fluid bypass between the corrugated sheet and the winding core. The seal bead is continuous and located between the plurality of layers and seals off flutes formed between the corrugated sheet of one layer and the first sheet of an adjacent layer.

In one embodiment, the first support bead extends at least 33% of a length of an interface length between the winding core and the corrugated sheet. In one embodiment, the first support bead extends an entire length of an interface length between the winding core and the corrugated sheet.

In one embodiment, the first support bead is formed from hot melt.

In one embodiment, the seal bead is formed from a foamed urethane and the first support bead is formed from hot melt.

In one embodiment, the first support bead provides an interface between the corrugated sheet and the first side of the support core and the first support bead cooperates with at least 50% of the first side when viewed in cross-section taken perpendicular to the winding axis.

In one embodiment, the first support bead provides an interface between the corrugated sheet and the first side of the support core and the first support bead extends 75% of the periphery of the first side from the first face to the second face when viewed in cross-section taken perpendicular to the winding axis.

In one embodiment, the filter media pack includes a second support bead parallel to the winding axis proximate the second side of the support core.

In one embodiment, the first support bead secures a lead end of the strip of fluted filter media to the winding core.

In one embodiment, the first edge of the plurality of layers forms a first flow face and the second edge of the plurality of layers forms a second flow face. The winding axis extending between the first and second flow faces.

In another embodiment a further method of forming a filter element is provided. This method may be combined with the prior method where appropriate. The method includes winding a continuous strip of fluted filter media about a winding core about a winding axis to form a plurality of layers of the fluted filter media. The strip of filter media extends between opposed first and second edges and includes a plurality of flutes formed by a first sheet operably secured to a corrugated sheet. The corrugated sheet defining a plurality of peaks and valleys.

The method includes applying at least one first stitch bead of adhesive between adjacent layers of the fluted filter media while winding such that a first sheet of a first layer is secured to a corrugated sheet of an adjacent second layer. The at least one first stitch bead is applied such that the at least one first stitch bead does not completely fill valleys formed by the corrugated sheet of the adjacent second layer.

In one embodiment, the continuous strip of fluted filter media includes at least one second stitch bead formed between the first sheet and the corrugated sheet prior to the step of winding the continuous strip of fluted filter media.

In one embodiment, the at least one first stitch bead of adhesive fills less than 10% of the cross-sectional area of the valleys formed by the corrugated sheet.

In one embodiment, the at least one first stitch bead is a discontinuous bead applied to the peaks of the corrugated sheet.

In one embodiment, the at least one first stitch bead is a continuous bead applied to the first sheet.

In one embodiment, the method includes applying a seal bead between adjacent layers of the fluted filter media, the seal bead filling the valleys formed by the corrugated sheet to prevent fluid bypass between the adjacent layers of the fluted filter media.

In one embodiment, the at least one first stitch bead is not applied to all peaks of the corrugated sheet.

In one embodiment, the at least one first stitch bead is applied to at least two consecutive peaks and then skips at least one peak of the corrugated sheet.

In one embodiment, the stitch bead is formed from hot melt

In one embodiment, the method includes allowing the stitch bead to partially solidify prior to fully winding the fluted filter media. The partial solidification can improve the engagement between the adjacent layers.

In one embodiment, the method includes applying first and second stitch beads while winding the fluted filter media. The first and second stitch beads are axially offset from one another in a direction parallel to the winding axis.

In another embodiment, a filter media pack is provided. The filter media pack includes a continuous strip of fluted filter media and at least one first stitch bead. The continuous strip of fluted filter media is wound about a winding core about a winding axis to form a plurality of layers of the fluted filter media. The strip of fluted filter media extends between opposed first and second edges and includes a plurality of flutes formed by a first sheet operably secured to a corrugated sheet. The corrugated sheet defines a plurality of peaks and valleys. The at least one first stitch bead is formed from an adhesive material and is located between adjacent layers of the fluted filter media such that a first sheet of a first layer is secured to a corrugated sheet of an adjacent second layer. The at least one first stitch bead is applied such that the at least one first stitch bead does not completely fill valleys formed by the corrugated sheet of the adjacent second layer.

In one embodiment, the continuous strip of fluted filter media includes at least one second stitch bead formed between the first sheet and the corrugated sheet prior to the step of winding the continuous strip of fluted filter media such that every interface between a first sheet and the corrugated sheet has a stitch bead therebetween. Thus, there is a stitch bead on both sides of each of the sheets of filter material in substantially all of the layers. The outer most piece of filter media forming an outer periphery of the block of filter media would not have the stitch beads.

In one embodiment, the at least one first stitch bead of adhesive fills less than 10% of the cross-sectional area of the valleys formed by the corrugated sheet.

In one embodiment, the at least one first stitch bead is a discontinuous bead applied to the peaks of the corrugated sheet.

In one embodiment, the at least one first stitch bead is a continuous bead applied to the first sheet.

In one embodiment, the filter media pack includes a first seal bead applied between adjacent layers of the fluted filter media. The first seal bead fills the valleys formed by the corrugated sheet to prevent fluid bypass between the adjacent layers of the fluted filter media.

In one embodiment, the at least one first stitch bead is not applied to all peaks of the corrugated sheet.

In one embodiment, the at least one first stitch bead is applied to at least two consecutive peaks and then skips at least one peak of the corrugated sheet.

In one embodiment, the filter media pack includes first and second seal beads. The first seal bead seals the corrugated sheet to the first sheet of the continuous strip of fluted filter media and the second seal bead seals the corrugated sheet of one layer to the first sheet of an adjacent layer while the continuous strip of fluted filter media is wound. The first and second seal beads are axially offset from one another to form inlet and outlet flutes.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
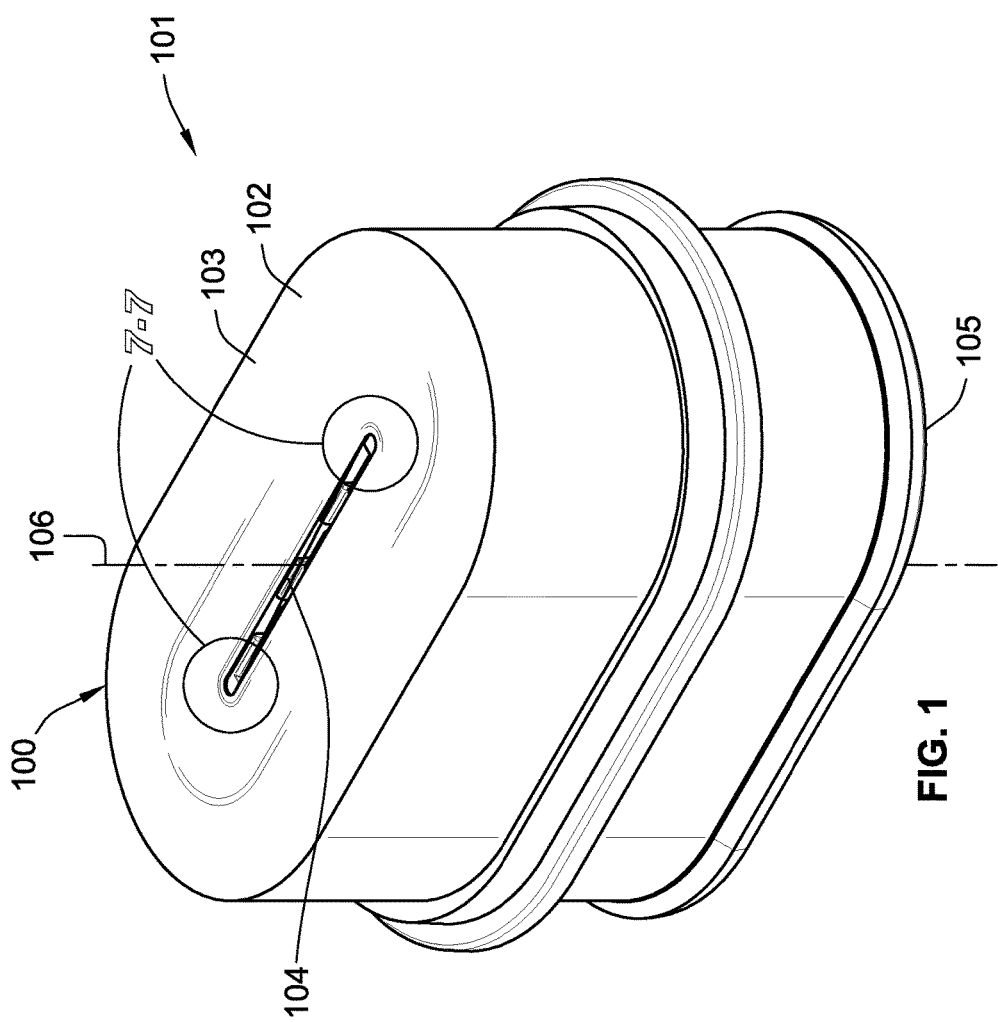
FIG. 1 is a perspective illustration of a filter element incorporating a filter media pack according to an embodiment of the invention.

FIG. 1 illustrates a fluted filter media pack 100 used in a filter element 101 according to an embodiment of the present disclosure. The fluted filter media pack 100 includes a fluted filter media 102 wound into a plurality of layers wound around a winding core 104. The plurality of layers are typically formed from a single continuous strip of fluted filter media 102 that is wound around the winding core 104 as it is rotated about a winding axis 106. The wound filter media will form first and second flow faces 103, 105 through which the filtered fluid will flow.

The illustrated embodiment is of a non-round configuration which may be seen as "race-track" shaped or oval. However, aspects of the invention described herein may find use in other shapes of wound media packs such as round media packs or media packs where one of the curved ends is larger than the other curved end.

Figure 2:
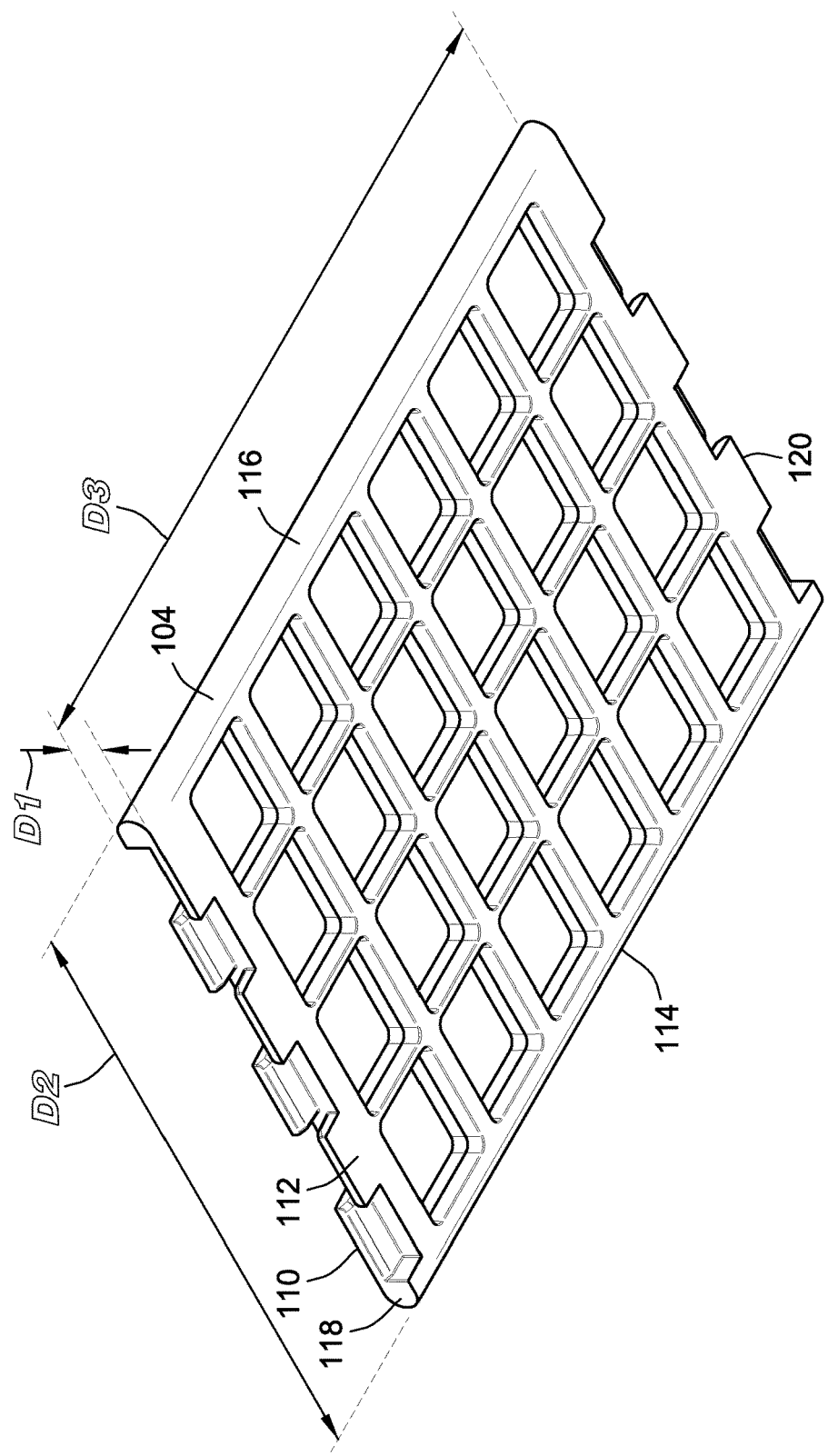
FIG. 2 is a winding core of the filter media pack of FIG. 1.

With additional reference to FIG. 2, the race-track shape of the instant media pack 100 is defined by the use of a winding core 104 that has generally rectangular opposed faces 110, 112 that extend between opposed first and second sides 114, 116. The opposed faces 110, 112 are spaced apart a first distance D1, which forms a minor axis, that is less than a second distance D2 between the opposed first and second sides 114, 116, which forms a major axis. Both the minor and major axes of the winding core 104 are generally perpendicular to the winding axis 106.

The winding core 104 will have a height between opposed ends 118, 120 illustrated by distance D3. The ends 118, 120 may include winding features that are used to engage corresponding features of a winder for transferring torque of the winder to the winding core 104.

The opposed faces 110, 112 will generally extend between the first and second sides 114, 116 as well as between the opposed ends 118, 120. The first and second sides 114, 116 will extend between the opposed faces 110, 112 and the opposed ends 118, 120.

In the illustrated embodiment, the opposed first and second sides 114, 116 are rounded as they extend between the first and second opposed faces 110, 112.

Figure 3:
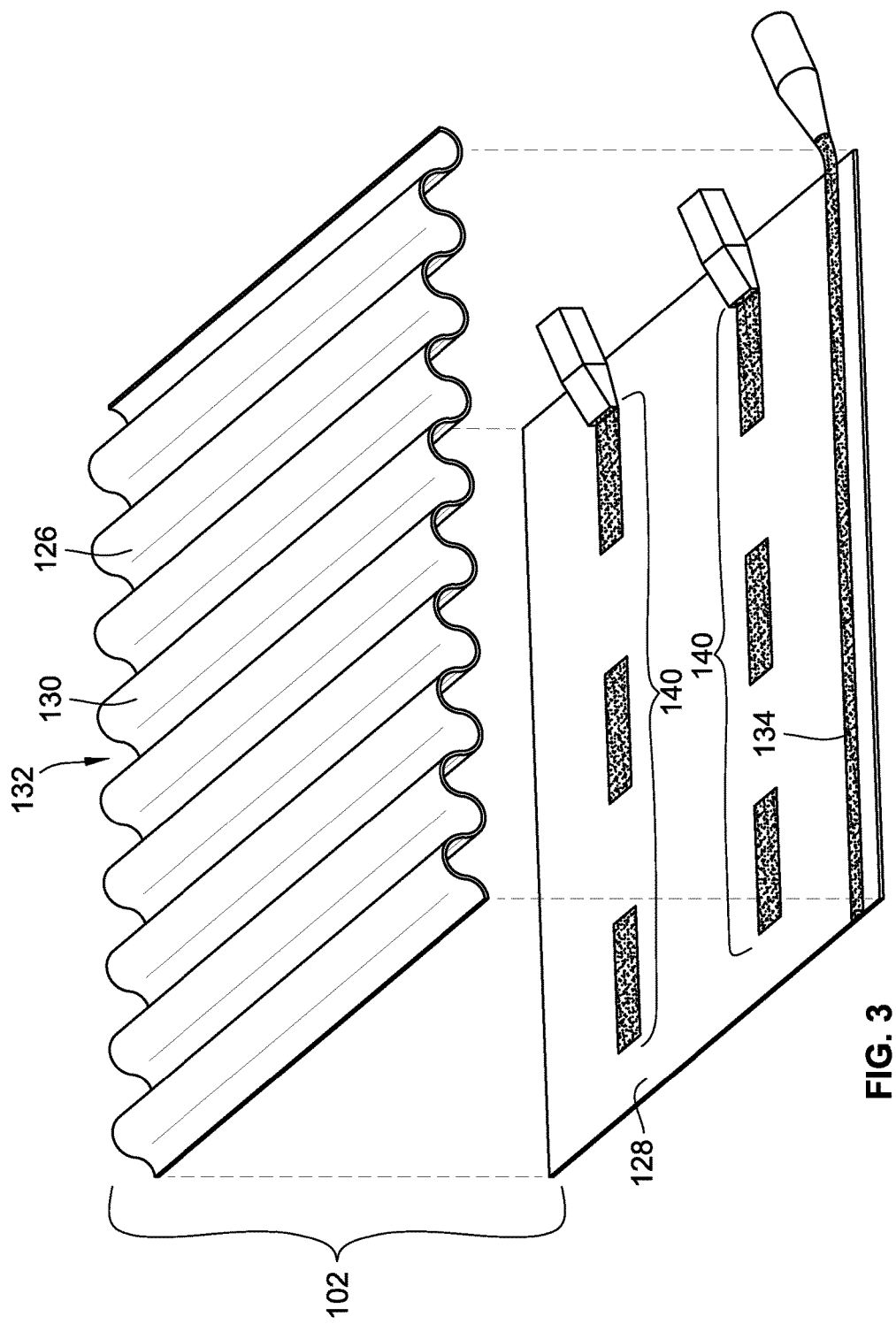
FIG. 3 is a schematic illustration of an example of fluted filter media used in forming filter media packs according to embodiments of the invention.
Figure 4:
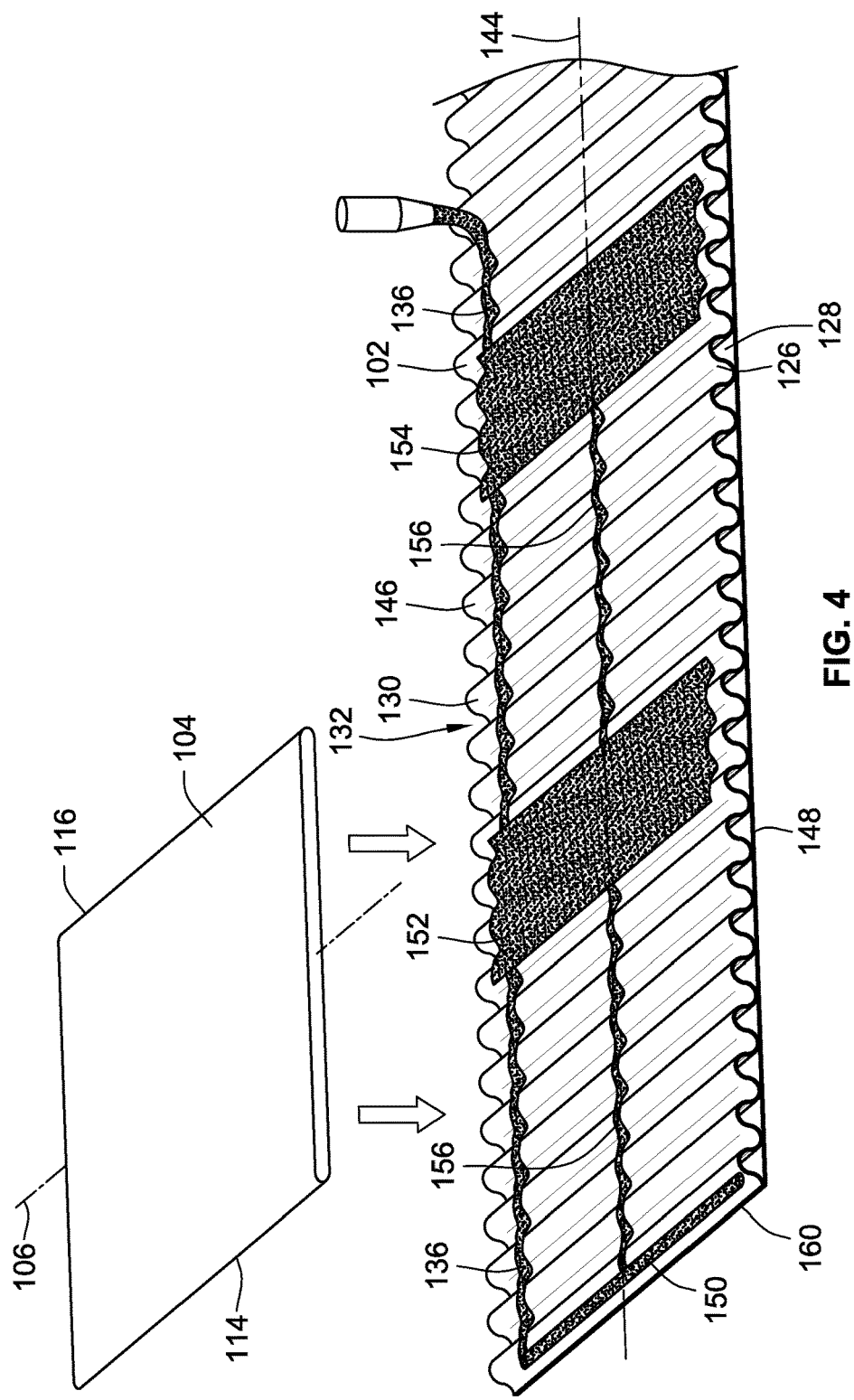
FIG. 4 is a simplified illustration of an application of support beads prior to a winding process for forming the filter media pack of FIG. 1.

With reference to the schematic illustration of FIGS. 3 and 4, each layer of fluted filter media 102 is generally formed by a pair of sheets of filter media secured together. In the illustrated embodiment, a corrugated sheet 126 is adhesively secured to a flat sheet 128. The fluted filter media 102 may be referred to as Z-media. Further, the corrugated sheet 126 could be formed in numerous ways including, but not limited to, corrugating or gathering. Additionally, while the fluted filter media 102 is formed from a corrugated sheet and a flat sheet in the illustrated embodiment, in other embodiments, both sheets could be corrugated sheets.

The corrugated sheet 126 has a plurality of peaks 130 and valleys 132. Securement of the corrugated sheet 126 to the flat sheet 128 helps maintain the peaks and valleys. The shape of the corrugated sheet 126, and particularly the peaks 130 and valleys 132 can vary from that which is in FIG. 3 and could be, for example, triangular, rectangular, etc. Further, while the peaks 130 and valleys 132 have a uniform width/shape from edge to edge of the sheet, the peaks and valleys could taper and be non-uniform as is well known in the art.

Typically, a seal bead 134 (FIG. 3) is applied between a first face of the corrugated sheet 126 and a first face of the flat sheet 128 to completely close off one end of the cavities formed between the flat sheet 128 and the corrugated sheet 126 due to the peaks and valleys of the corrugated sheet to form a first set of flutes. These cavities are formed between the peaks 130 and the first face of the flat sheet 128. This seal bead 134 is applied proximate one of the edges of the corrugated sheet 126 and flat sheet 128.

With reference to FIG. 4, a second seal bead 136 will be applied proximate the opposite edge between adjacent layers of the fluted filter media 102 as the fluted filter media 102 is wound. The second seal bead 136 will be spaced apart from the first seal bead 134 and located on an opposite second face of the corrugated sheet to close the valleys on the opposite side of the corrugated sheet to form a second set of flutes.

In the illustrated embodiment, a layer of fluted filter media 102 includes both a sheet and a corrugated sheet such that one side of the layer is provided by an exposed face of the flat sheet 128 and the other side of the layer is provided by the an exposed face of the corrugated sheet 126.

With reference to FIG. 3, during formation of the fluted filter media 102, one or more stitch beads 140 (two illustrated in FIG. 3) may assist in securing the corrugated sheet 126 to the flat sheet 128. The stitch beads 140 assists seal bead 134 in securing the corrugated sheet 126 in its corrugated configuration across the entire width of the fluted filter media 102 between the opposed edges thereof.

In the illustrated embodiment, the stitch beads 140 are discontinuous sections of adhesive applied to the flat sheet 128. However, the stitch beads 140 could be provided by continuous strips of adhesive. Further, in alternative embodiments, the stitch beads 140 could be applied to the face of the corrugated sheet 126, such as opposite valleys 132 in FIG. 3. The stitch beads 140 could be applied to every valley 132 or could be intermittently applied to the valleys 132 similar to the pattern applied to the flat sheet 126 in FIG. 3. The stitch beads 140 will be configured, e.g. their height extending away from the face of the corresponding sheets 126, 128, such that the stitch beads 140 do not block much if any of the cross-sectional area of the cavities (also referred to as flutes) formed between corrugated sheet 126 and flat sheet 128. Preferably, a given portion of a stitch bead will not block more than 5% of an individual flute after the fluted filter media is formed, even more preferably, the stitch bead will block less than 2.5%. However, other embodiments could utilize more adhesive and block more an individual flute depending on the strength requirements to form a desired fluted filter media. This is unlike seal bead 134 which is configured to fully close the cross-sectional area of the flutes.

Typically, the fluted filter media 102 is formed and wound up into rolls of fluted filter media and the seal bead 134 and stitch beads 140 are allowed to cure prior to formation of a filter media pack. Once sufficient cure has occurred, the fluted filter media 102 will then be wound around the winding core 102 described above. As the fluted filter media 102 is unwound from the roll, it is wound around the winding core 102. However, that is not necessary in all implementations and it is possible to form the fluted filter media 102 and then immediately wind the resultant product around the winding core 102.

FIG. 4 illustrates preparation of the formation of fluted filter media pack 100. In FIG. 4, a continuous strip of fluted filter media 102 extends along a fluted filter feed line 144 that is generally parallel to opposed first and second edges 146, 148 of the fluted filter media 102. Second seal bead 136 is being applied to the exposed face of the corrugated sheet 126 such that sufficient material is provided to fill the valleys 132 to prevent fluid bypass.

Three strips of adhesive 150, 152 and 154 have been applied to the exposed face of the corrugated sheet 126. The strips of adhesive 150, 152, 154 typically are an adhesive material and most typically a hot melt material. The strips of adhesive 150, 152, 154 extend transverse to the feed line 144. The strips of adhesive 150, 152, 154 extend generally parallel to the peaks 130 and valleys 132 between the first and second edges 146, 148. As the fluted filter media 102 is wound, it edges 146, 148 will form flow faces 103, 105 (see FIG. 1). The strips of adhesive 150, 152, 154 extend between the first and second flow faces 103, 105 and generally parallel to winding axis 106.

The strips of adhesive 150, 152, 154 are used, in part, to secure the winding core 104 to the fluted filter media 102. It is noted that the spacing of the three strips of adhesive 150, 152 and 154 is simply schematic. Similarly, the dimensions of the winding core 104 are not to scale and the winding core 104 is simply shown in a schematic form to illustrate the assembly steps. The same applies to FIGS. 5 and 6.

An attachment bead 156 may be applied that is generally parallel to feed line 144 and parallel to edges 146, 148 and that extends generally between first strip of adhesive 150 and third strip of adhesive 154. This attachment bead 156 helps secure the winding core 104 to the fluted filter media 102 as well as provide a secondary seal between the winding core 104 and corrugated sheet 126 to prevent inadvertent leak paths. The adhesive bead 156 will typically be formed from the same material as strips of adhesive 150, 152, 154.

Figure 5:
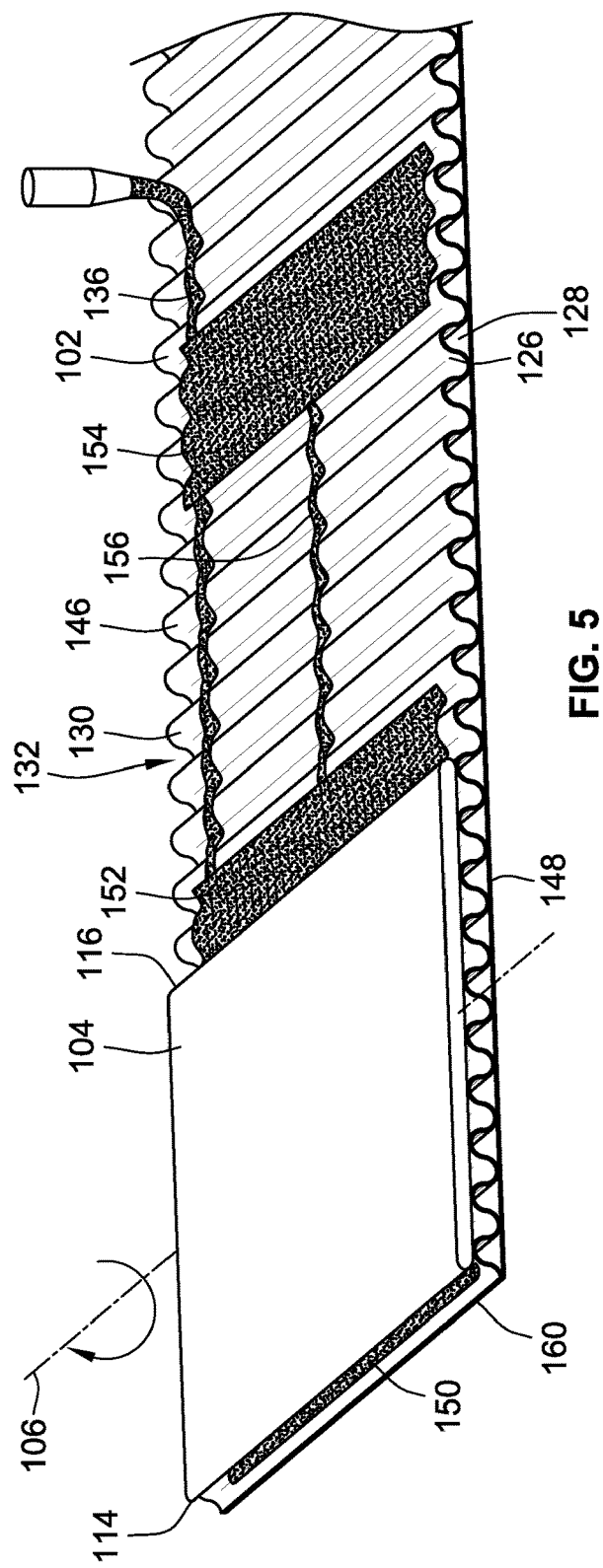
FIG. 5 illustrates the winding core of the filter media pack applied to the strip of filter media prior to winding.

With additional reference to FIG. 5, after the strips of adhesive 150, 152, 154 as well as second seal bead 136 and, if included, attachment bead 156 have been applied to the exposed face of the corrugated sheet 126, the winding core 104 is attached to the fluted filter media 102 using the various strips of adhesive and seal material.

The first side 114 of the winding core 104 is aligned with the first strip of adhesive 150 and the second side 116 of the winding core is aligned with second strip of adhesive 152. The first and second sides 116 thus extend transverse to edges 146, 148 as well as to feed line 144. The first strip of adhesive 150 secures the lead end 160 of the continuous strip of fluted filter media 102 to the winding core 104.

Figure 6:
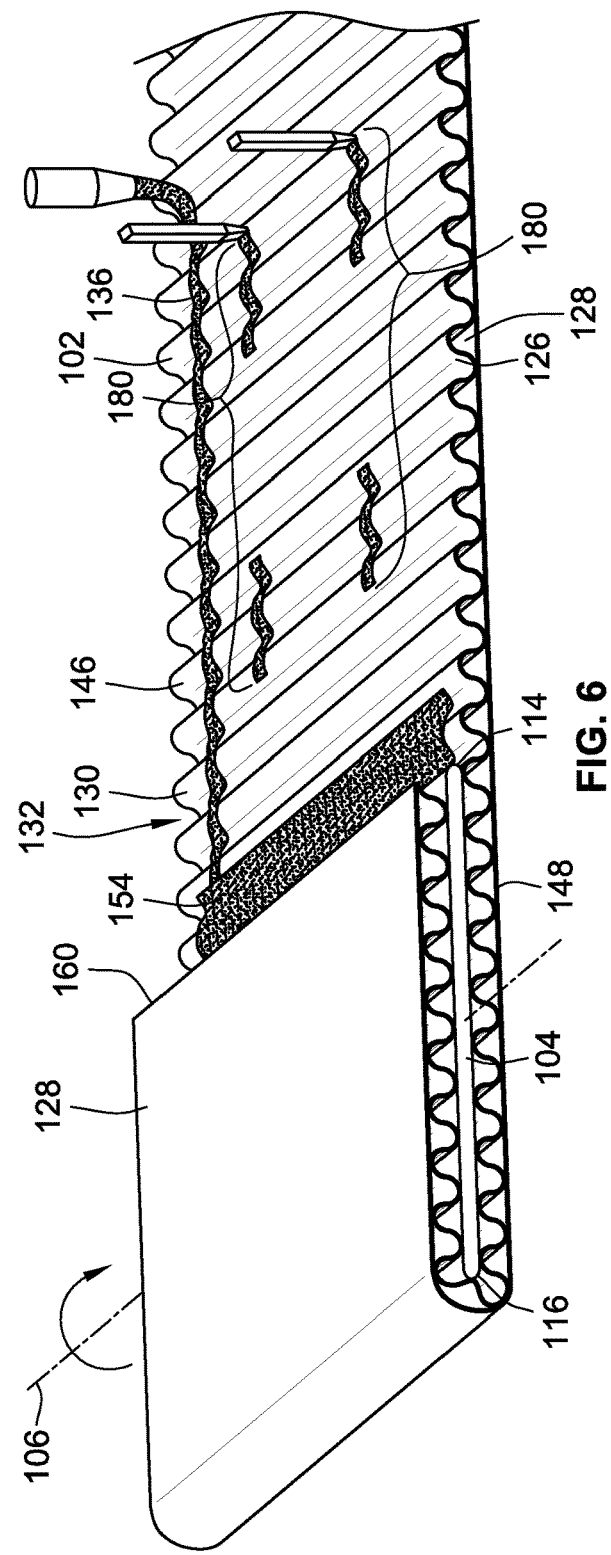
FIG. 6 illustrates initial winding of the filter media pack.

The winding core 104 is then rotated about winding axis 106 and the fluted filter media is wound around winding core 104 to form a plurality of layers around the winding core 104. After one half rotation, e.g. a rotation of 180 degrees as illustrated in FIG. 6, the first end of the winding core 104 is adjacent the third strip of adhesive 154.

The first layer of fluted filter media 102 has the exposed face of the corrugated sheet 126 adjacent the outer periphery of the winding core 104. After the first layer of fluted filter media 102 is wrapped around the winding core 104, a second set of flutes is formed between the exposed face of the flat sheet 128 of the previously wound layer of fluted filter media 102 the exposed face of the corrugated sheet 126 of the layer that is currently being formed.

Figure 7:
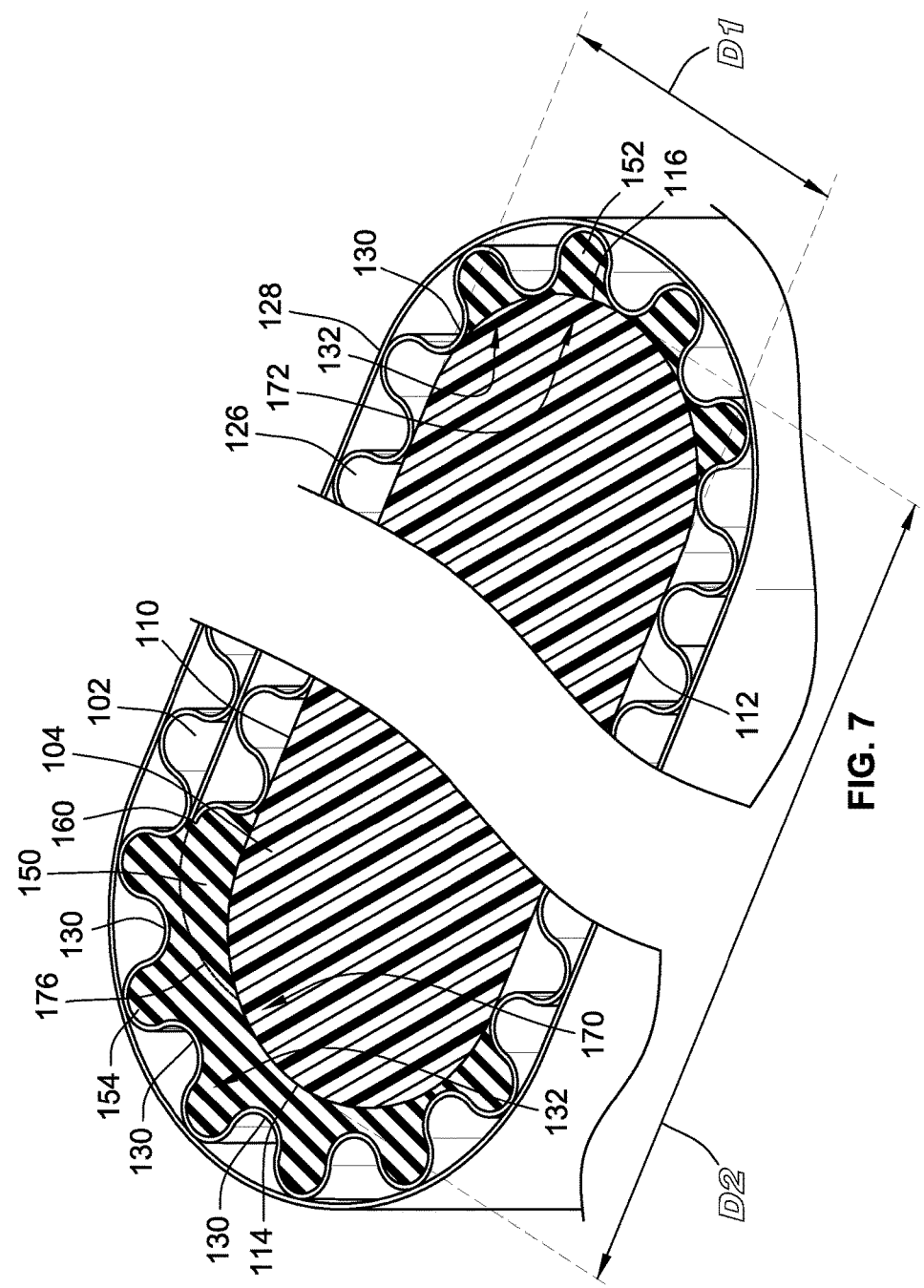
FIG. 7 is a simplified illustration of the support beads of the filter media pack of FIG. 1.

With reference to FIG. 7, not only are strips of adhesive 150, 152, 154 used to securely attach the fluted filter media 102 to the winding core 104, but the strips of adhesive 150, 152, 154 form support beads 170, 172 to help distribute the forces that are transmitted from first and second sides 114, 116 of the winding core 104 to the fluted filter media 102 due to the tension in the fluted filter media 102 during the winding process. More particularly, the support beads 170, 172 fill a plurality of valleys 132 adjacent the first and second sides 114, 116 such that it is unlikely that the forces acting between the winding core 104 and the fluted filter media 102 are directly focused on any one peak 130 of the corrugated sheet 126 as the winding core 104 is rotated about winding axis 106.

Preferably, the support beads 170, 172 extend into at least two valleys 132 (on opposite sides of a given peak 130). More preferably, the support beads 170, 172 extend into at least three valleys 132 and preferably at least four valleys 132.

It is noted that support bead 170 is formed from a combination of both the first and third strips of adhesive 150, 154 to form a continuous mass of adhesive. The first and third strips of adhesive 150, 154 are illustrated schematically by dashed line 176. However, in operation, no such demarcation would be expected. It is notable that in the illustrated embodiment, the free end 160 of the strip of filter media 102 is captured in the support bead 170.

In the illustrated embodiment, the adhesive forming the support beads 170, 172 fully fill the cross-section of a plurality of the valleys 132 of the corrugated sheet 126. However, other embodiments may not have the valleys 132 fully filled.

Preferably, the support beads 170, 172 extend around the first and second sides 114, 116 at least 75% of the distance between the first and second faces 110, 112 and more preferably at least 90% and more preferably at least 95% and more preferably entirely between the first and second faces 110, 112.

Further, the support beads 170, 172 preferably extend at least 33% of the length parallel to the winding axis of the interface between the fluted filter material 102 and the winding core 104, more preferably at least 50% of the length of the interface, more preferably at least 75% of the length of the interface and even more preferably the entire length of the interface.

The seal beads 134, 136 (see FIGS. 3 and 4) may be formed from a different material than the support beads 170, 172. For instance, the seal beads 134, 136 may be formed from a foamed or expanding urethane material while the support beads 170, 172, as indicated above, could be formed from a hot melt material.

With reference to FIG. 6, stitch beads 180 are also applied between adjacent layers of fluted filter media. The stitch beads 180 may be applied directly to the peaks 132 of the exposed face of the corrugated sheet 126 fluted filter media 102 as illustrated in FIG. 6. Alternatively, the stitch beads 180 could be applied to the exposed face of flat sheet 128. Further, the stitch beads 180 could be discontinuous segments of adhesive (as illustrated) or could be continuous strips of adhesive (such as if applied to the flat sheet 128. Further, the stitch beads will typically fill no more than 5% of the cross-sectional area of a given flute formed between adjacent layers and preferably less than 2.5%. However, stitch beads filling a greater portion of the flutes could be implemented where greater holding strength is required.

The use of stitch beads 180 during the winding process will prevent slippage of the adjacent layers of filter media 102 and potential damage to second seal bead 136 or to any of the flutes by crushing the corrugated sheet 126 of fluted filter media 102.

The stitch beads 180 could be provided by a light cure material that could be cured right as the stitch bead is being sandwiched between adjacent layers of material such that improved engagement occurs between the adjacent layers of media almost immediately. The light cure material could be a light cure resin acrylic that cures when exposed to a predetermined wavelength of light. Alternatively, the stitch bead could be provided by a fast acting 2-part urethane. Some difficulties exist when using 2-part materials. Further, heat may be applied to promote the cure rate of the 2-part urethane.

In one embodiment the second seal 136, the strips of adhesive 150, 152, 154, strip 156 and the stitch beads 180 could all be provided by the same type of material. This would typically be a hot melt.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of forming a filter media pack comprising:
    winding a continuous strip of fluted filter media about a winding core about a winding axis, the strip of filter media extending between opposed first and second edges and including a plurality of flutes formed by a first sheet operably secured to a corrugated sheet defining a plurality of peaks and valleys, the strip of fluted filter media being wound with the corrugated sheet being adjacent the winding core and radially inward of the first sheet, the strip of fluted filter media defining a feed axis generally parallel to the first and second edges and perpendicular to the winding axis, the winding core having opposed first and second sides extending generally parallel to the winding axis, the winding core defining opposed first and second faces defining a minor axis therebetween, the first and second sides extending generally between the first and second faces and defining a major axis therebetween; and applying a first support bead between the winding core and the strip of filter media, the first support bead extending generally perpendicular to the first and second edges of the strip of filter media and parallel to the winding axis, the first support bead being located proximate the first side of the winding core, the first support bead filling the cross-section of at least two valleys on opposite sides of a peak of the corrugated sheet proximate the first side of the winding core, the first support bead distributing radially directed loading applied to the corrugated sheet from the first side of the winding core due to tension in the strip of filter media during winding.

2. The method of claim 1, further comprising applying a seal bead generally parallel to the first and second edges of the strip of filter media and between the corrugated sheet and the winding core to prevent fluid bypass between the corrugated sheet and the winding core.

3. The method of claim 1, wherein the first support bead extends at least 33% of a length of an interface length between the winding core and the corrugated sheet.

4. The method of claim 1, wherein the first support bead extends an entire length of an interface length between the winding core and the corrugated sheet.

5. The method of claim 1, wherein the first support bead is allowed to partially cure before more than a first layer of the filter media is wound around the winding core.

6. The method of claim 1, wherein the first support bead is formed from hot melt.

7. The method of claim 2, wherein the seal bead is formed from a foamed urethane.

8. The method of claim 1, wherein the first support bead provides an interface between the corrugated sheet and the first side of the winding core and the first support bead cooperates with at least 50% of the first side when viewed in cross-section taken perpendicular to the winding axis.

9. The method of claim 1, wherein the first support bead provides an interface between the corrugated sheet and the first side of the winding core and the first support bead extends 75% of the periphery of the first side from the first face to the second face when viewed in cross-section taken perpendicular to the winding axis.

10. The method of claim 1, further comprising applying a second support bead parallel to the winding axis proximate the second side of the winding core.

11. The method of claim 10, wherein the steps of applying the first and second support beads occur prior to winding.

12. The method of claim 11, wherein the step of applying the first support bead occurs by dispensing two separate strips of a material forming the first support bead to the strip of fluted filter media prior to winding such that three strips of material forming the first and second support beads are dispensed on the strip of fluted filter media prior to winding, after winding, the two separate strips of material form a single continuous strip of material that forms the first support bead.

13. The method of claim 1, wherein the step of applying the first support bead occurs by dispensing two separate strips of a material forming the first support bead to the strip of fluted filter media prior to winding, after winding, the two separate strips of material form a single continuous strip of material that forms the first support bead.

14. The method of claim 13, wherein one of the two separate strips secures a lead end of the strip of fluted filter media to the winding core.

15. A filter media pack comprising:

a winding core having opposed first and second sides extending generally parallel to a winding axis, the winding core defining opposed first and second faces defining a minor axis therebetween in a direction perpendicular to the winding axis, the first and second sides extending generally between the first and second faces and defining a major axis therebetween in a direction perpendicular to the winding axis;

a continuous strip of fluted filter media wound about the winding core about the winding axis to form a plurality of layers of fluted filter media, the strip of filter media extending between opposed first and second edges and including a plurality of flutes formed by a first sheet operably secured to a corrugated sheet defining a plurality of peaks and valleys, the strip of fluted filter media having the corrugated sheet being adjacent the winding core and radially inward of the first sheet;

a first support bead between the winding core and the strip of filter media, the first support bead extending generally perpendicular to the first and second edges of the strip of filter media and parallel to the winding axis, the first support bead being located proximate the first side of the winding core, the first support bead filling the cross-section of at least two valleys on opposite sides of a peak of the corrugated sheet proximate the first side of the winding core.

16. The filter media pack of claim 15, further comprising a seal bead generally parallel to the first and second edges of the strip of filter media and between the corrugated sheet and the winding core to prevent fluid bypass between the corrugated sheet and the winding core; the seal bead being continuous and located between the plurality of layers and sealing off flutes formed between the corrugated sheet of one layer and the first sheet of an adjacent layer.

17. The filter media pack of claim 15, wherein the first support bead extends at least 33% of a length of an interface length between the winding core and the corrugated sheet.

18. The filter media pack of claim 15, wherein the first support bead extends an entire length of an interface length between the winding core and the corrugated sheet.

19. The filter media pack of claim 15, wherein the first support bead is formed from hot melt.

20. The filter media pack of claim 16, wherein the seal bead is formed from a foamed urethane and the first support bead is formed from hot melt.

21. The filter media pack of claim 15, wherein the first support bead provides an interface between the corrugated sheet and the first side of the winding core and the first support bead cooperates with at least 50% of the first side when viewed in cross-section taken perpendicular to the winding axis.

22. The filter media pack of claim 15, wherein the first support bead provides an interface between the corrugated sheet and the first side of the winding core and the first support bead extends 75% of the periphery of the first side from the first face to the second face when viewed in cross-section taken perpendicular to the winding axis.

23. The filter media pack of claim 15, further comprising a second support bead parallel to the winding axis proximate the second side of the winding core.

24. The filter media pack of claim 15, wherein the first support bead secures a lead end of the strip of fluted filter media to the winding core.

25. The filter media pack of claim 15, wherein the first edge of the plurality of layers forms a first flow face and the second edge of the plurality of layers forms a second flow face.

* * * * *